(12) United States Patent
Rench

(10) Patent No.: US 8,215,594 B1
(45) Date of Patent: Jul. 10, 2012

(54) MUSICAL INSTRUMENT CABLE CLIP

(76) Inventor: Chris Alan Rench, Piqua, OH (US)

( * ) Notice: Subject to any disclaimer, the term of this patent is extended or adjusted under 35 U.S.C. 154(b) by 831 days.

(21) Appl. No.: 12/174,142

(22) Filed: Jul. 16, 2008

Related U.S. Application Data

(60) Provisional application No. 60/959,664, filed on Jul. 16, 2007.

(51) Int. Cl.
*E04G 3/00* (2006.01)
(52) U.S. Cl. .................................... 248/74.2; 248/316.7
(58) Field of Classification Search ............... 248/58, 248/63, 65, 74.1, 74.2, 304, 339, 316.7, 316.1, 248/309.1
See application file for complete search history.

(56) References Cited

U.S. PATENT DOCUMENTS

| | | | |
|---|---|---|---|
| 3,951,504 A | 4/1976 | Clark | |
| D254,943 S * | 5/1980 | Hepworth | D6/323 |
| 4,357,063 A | 11/1982 | Gray | |
| 4,557,446 A | 12/1985 | Barron | |
| 4,646,998 A * | 3/1987 | Pate | 248/250 |
| 4,715,259 A | 12/1987 | Wittman | |
| 4,773,874 A | 9/1988 | Kopeski, Jr. | |
| 4,903,920 A | 2/1990 | Merritt | |
| 4,925,399 A | 5/1990 | Bosworth et al. | |
| D309,859 S | 8/1990 | Lysgaard | |
| 5,119,529 A | 6/1992 | Kaye | |
| 5,145,399 A | 9/1992 | Davenport | |
| 5,364,289 A | 11/1994 | Noguchi et al. | |
| 5,411,228 A | 5/1995 | Morawa et al. | |
| 5,615,852 A | 4/1997 | Heidorn et al. | |
| 5,739,474 A | 4/1998 | Bradley | |
| 5,771,750 A | 6/1998 | Bell et al. | |
| 6,158,095 A | 12/2000 | Lassiter | |
| 6,198,031 B1 | 3/2001 | Jones | |
| 6,257,920 B1 | 7/2001 | Finona et al. | |
| D459,194 S | 6/2002 | Johansson et al. | |
| 6,508,442 B1 * | 1/2003 | Dolez | 248/74.1 |
| 6,523,231 B1 | 2/2003 | Lassiter | |
| D473,624 S | 4/2003 | Rae | |
| 6,621,982 B1 | 9/2003 | Kimura et al. | |
| 6,665,484 B2 | 12/2003 | Douglas et al. | |
| 6,732,983 B1 | 5/2004 | Blake et al. | |
| 6,771,871 B2 | 8/2004 | Krampotich et al. | |
| 6,802,480 B1 | 10/2004 | Martello | |
| D506,160 S * | 6/2005 | Lambert | D11/148 |
| 7,004,782 B2 | 2/2006 | Kroenung | |

(Continued)

OTHER PUBLICATIONS

STRINGSANDBEYOND.COM, Gravity Guitar Innovations CableCure, http://www.stringsandbeyond.com/grguinca.html (last visited Jul. 1, 2009).

*Primary Examiner* — Terrell McKinnon
*Assistant Examiner* — Steven Marsh
(74) *Attorney, Agent, or Firm* — William B. Richards, Esq.; The Richards Law Firm LLC

(57) ABSTRACT

A musical instrument cable clip is provided which secures the musical instrument cable loop to the musical instrument. The clip includes a base portion to one end of which may be appended a strap post. The other end includes a switchback portion which has a rib with a ridge appended to an interior surface of the switchback. The clip is secured to the musical instrument and the cable is placed within the switchback where it is held by being grabbed or bit by the ridge.

20 Claims, 6 Drawing Sheets

U.S. PATENT DOCUMENTS

| | | |
|---|---|---|
| 7,011,283 B2 | 3/2006 | Lemire |
| 7,052,305 B2 | 5/2006 | Kurokawa |
| 7,097,473 B2 | 8/2006 | Krampotich et al. |
| 7,108,544 B2 | 9/2006 | Zoeller |
| 7,256,337 B1 | 8/2007 | Walker |
| 7,298,608 B2 | 11/2007 | Okumura |
| 7,346,252 B2 | 3/2008 | Krampotich et al. |
| 7,462,278 B2 * | 12/2008 | Meritt-Powell ......... 210/167.17 |
| 2007/0125220 A1 | 6/2007 | Taylor |
| 2007/0134973 A1 | 6/2007 | Coco |
| 2008/0078891 A1 * | 4/2008 | Hobson ..................... 248/74.2 |
| 2008/0203247 A1 * | 8/2008 | Hill ............................ 248/74.2 |
| 2009/0184219 A1 * | 7/2009 | Chen ......................... 248/205.5 |

* cited by examiner

MUSICAL INSTRUMENT CABLE CLIP

RELATED APPLICATIONS

This application claims the benefit of U.S. Prov. Pat. App. Ser. No. 60/959,664, filed Jul. 16, 2007.

FEDERALLY-SPONSORED RESEARCH AND DEVELOPMENT (Not Applicable)

APPENDIX (Not Applicable)

FIELD OF THE INVENTION

This invention relates generally to clips for securing musical instrument cables and more particularly to clips that attach to the musical instrument.

BACKGROUND OF THE INVENTION

Many musical instruments, particularly when played in large venues, employ, for example, ancillary equipment such as amplifiers. To provide the necessary connectivity between the musical instrument and the amplifier, a cable from the amplifier is attached to the body of the instrument. The musician will often move about on stage, sometimes a considerable distance from the amplifier to which his instrument is connected. In doing so, there is always a risk that the cable will become caught or stepped on and, as the musician moves, the cable may be pulled or jerked from the instrument. This may result in damage to the cable jack, the socket in the musical instrument, or both, as well as total loss of amplified sound.

Musicians have been known to drape the cable over their shoulders, or, in the case of a guitar, for example, thread the cable through the strap loop. These solutions provide a degree of protection by partially supporting the draped cable. The cable may, however, still slip when caught and detach from the instrument. Standard hooks attached to the instrument may provide further protection, but may not provide sufficient holding force to protect the cable from detaching when caught. In addition, a single hook may not accept the wide variety of cable sizes currently found on the market resulting in a poor fit between the hook and the cable and loss of holding force.

What is needed in the art of securing musical instrument cables is a way of providing a holding force on the cable which guards against the cable becoming disconnected from the instrument if it becomes caught and tugged or jerked, as well as providing for cables of varying sizes.

SUMMARY OF THE INVENTION

To meet these needs, the present invention features an apparatus that securely holds musical instrument cables and provides increased holding force as the cable is subjected to increased tugging or jerking. A variety of cable sizes may be accommodated.

In accordance with an embodiment of the present invention, a one-piece musical instrument cable clip is provided. The clip comprises a strip-like base that has a top surface, a bottom surface, a proximal end, and a free end. The proximal end is formed to include, on the top surface, a post. The post is formed to include a round flange atop a column interposed between the flange and the top surface. The post may function as a strap button or strap post for a guitar strap. The free end is formed to include a switchback. The switchback is formed to include a switchback base portion adjacent the base, a switchback reverse portion adjacent the switchback base portion, and a switchback finger portion adjacent the switchback reverse portion. The switchback base, reverse, and finger portions each have a respective inner surface. The switchback finger portion inner surface is in a facing, spaced-apart relation with the switchback base portion inner surface. A rib runs generally along the inner surfaces of the switchback base, reverse, and finger portions and has a ridge formed along the top.

There may be a countersunk hole through the post to facilitate securing the clip to the musical instrument, with, for example, a screw.

A cross-section of the rib may form an angle of about 35 degrees.

A cross section of the ridge may have a radius of curvature of about 0.03 inches.

A portion of the rib formed on the switchback base portion inner surface and a portion of the rib formed on the switchback finger portion inner surface may form an angle of about 10 degrees.

A portion of the rib formed on the switchback reverse portion inner surface may have a radius of curvature of about 0.08 inches.

The top of the post and the switchback finger portion outer surface may be even.

The clip may be formed of nylon 6,6.

The switchback finger portion may be flexible relative to the switchback base portion.

In another embodiment, a musical instrument cable clip is provided that comprises a base, switchback base, reverse, and finger portions, and switchback base, reverse, and finger ribs. The switchback base portion is appended to a distal end of the base portion, the switchback reverse portion is appended to the switchback base portion, and the switchback finger portion is appended to the switchback reverse portion. The base portion and the switchback base, reverse, and finger portions cooperate to form a J-shape. A rib is appended along the inside of the switchback and generally follows the contours of the inside of the switchback.

The rib may comprise a ridge.

In yet another embodiment, a musical instrument cable clip is provided that comprises a base with a rib appended to the base. The rib has a base portion, including a base portion ridge, a reverse portion, including a reverse portion ridge, and a finger portion, including a finger portion ridge. The rib base portion ridge is in a facing, spaced apart relation with the rib base portion ridge.

Additional objects, features, and advantages of the invention will become apparent to those skilled in the art upon consideration of the following detailed description of embodiments of the invention.

Figure 1:
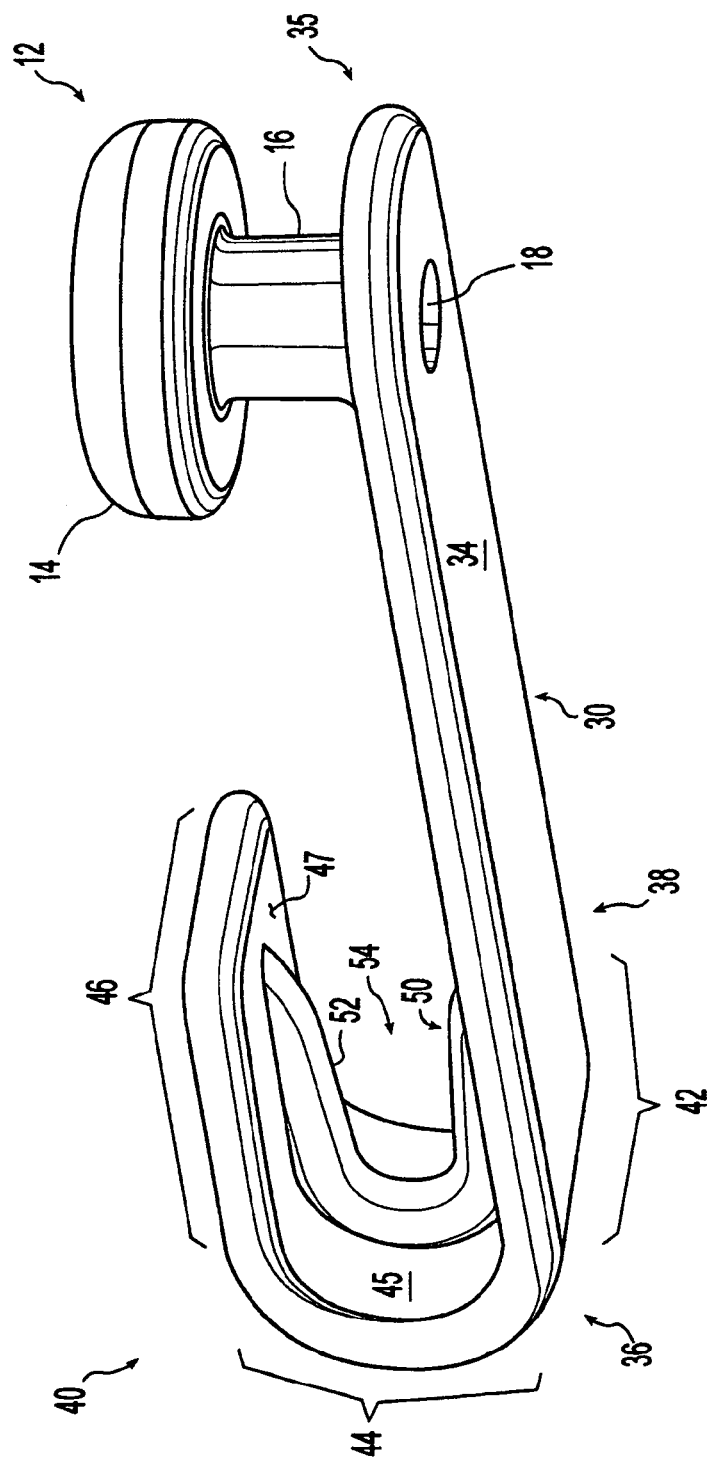
FIG. 1 is a perspective view of an embodiment of a musical instrument clip according to the present invention.

In describing embodiments of the invention which are illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION

U.S. Prov. Pat. App. Ser. No. 60/959,664, filed Jul. 16, 2007, the above-claimed priority application, is incorporated in the application by reference.

This detailed description in connection with the drawings is intended principally as a description of embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

Figure 2:
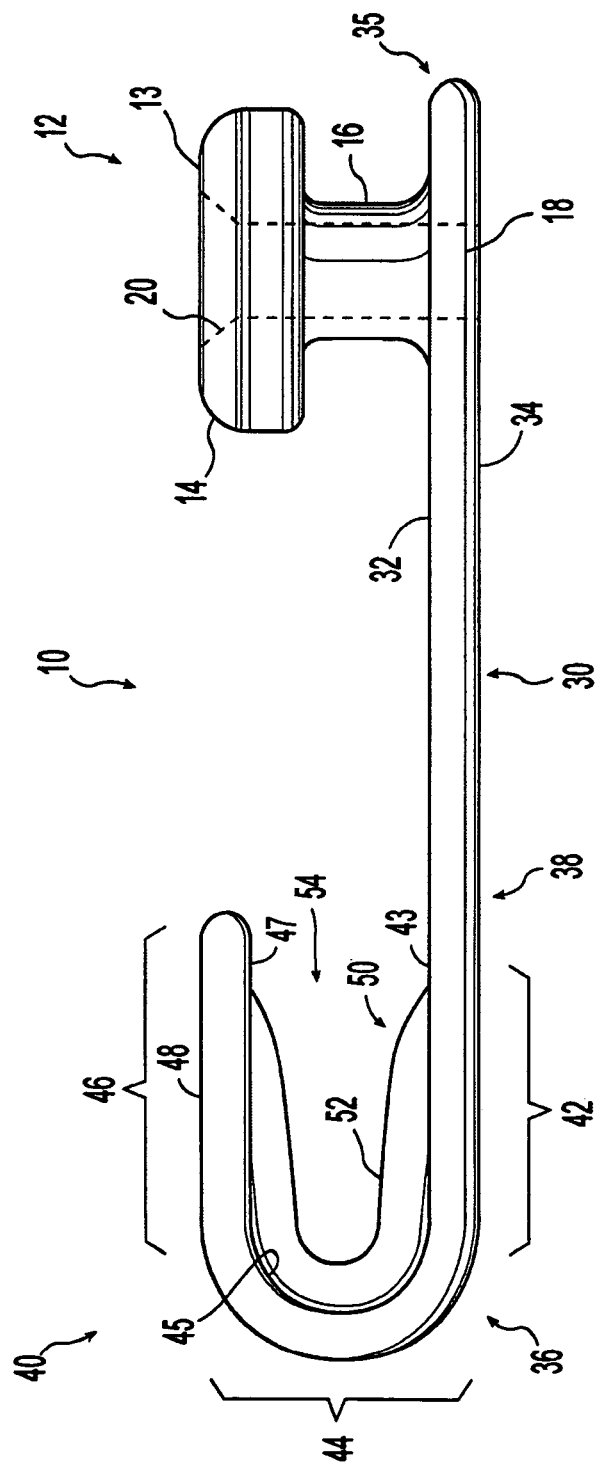
FIG. 2 is a side elevation view of the clip of FIG. 1.
Figure 3:
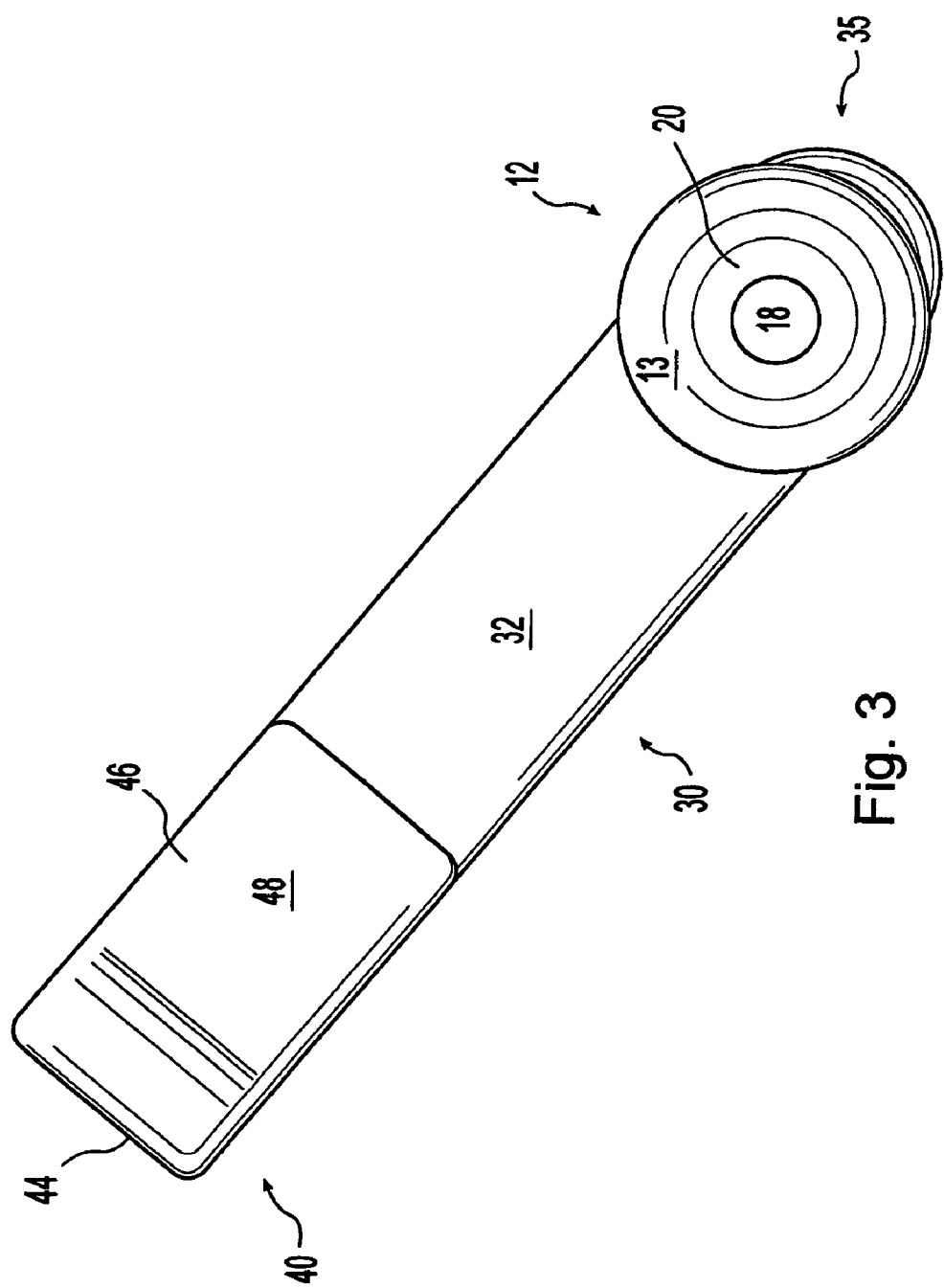
FIG. 3 is a top view of the clip of FIG. 1.
Figure 6:
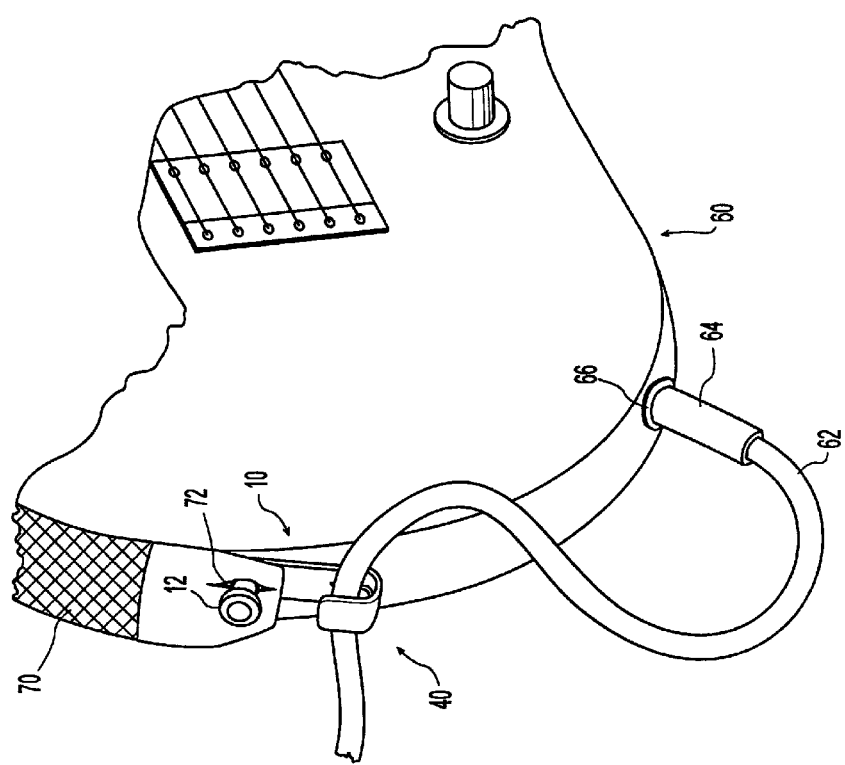
FIG. 6 is an environmental view of the clip in combination with a guitar.

An embodiment of the musical instrument clip 10 in accordance with the present invention is shown in FIGS. 1-3. The clip 10 shown may be of a one-piece construction, but need not be. As will be appreciated by those skilled in the relevant art, the clip 10 may be made by assembling several components. For example, clip components of varying sizes could be connected to meet specific requirements such as engaging a large or small cable 62 (FIG. 6). The clip 10 may be formed from a plastic material such as nylon and, more particularly nylon 6,6. Such materials can offer durability, precision in manufacturing, as well as a degree of flexibility. In general, the clip 10 may exhibit a J-shaped profile.

The clip 10 comprises a base 30, which, as shown, is strip-like in construction. The base 30 includes a top surface 32 and a bottom surface 34. The bottom surface 34 may be substantially flat as shown in FIG. 1. Alternatively, the bottom surface 34 may be curved, for example, to match the curvature of a musical instrument 60 (FIG. 6) such as a guitar. Other shapes for the bottom surface 34 are also possible, depending upon the need to match the surface of the musical instrument 60 to which the clip 10 will be attached. By presenting a bottom surface 34 which matches the surface of the musical instrument 60, the clip 10 may be more easily and effectively secured to the instrument 60. For example, the clip 10 may be adhered to the instrument 60 with glue or other adhesive or with two-sided adhesive tape. As discussed below, the clip 10 may also be secured to the instrument 60 with, for example, a screw (not shown).

The base 30 may also include a dimple on the top surface 32 to facilitate the user drilling a hole through the base 30 to further secure the clip 10 to the instrument 60.

The clip base 30 also comprises a proximal end 35. The proximal end 35 may be formed to include a post 12, or, when the musical instrument 60 is a guitar or similar instrument, the post 12 may be a strap post. To allow the post 12 to accommodate a strap 70, the post 12 may be formed to include a round flange 14 atop a column 16. Such posts 12 are also known as buttons since they enable the strap 70, which may include a buttonhole-style hole 72 (FIG. 6), to facilitate attaching the strap 70 to the instrument 60. The post 12 is appended to, or formed onto, the top surface 32 of the base.

To facilitate attaching the clip 10 to the instrument 60, a hole 18 may be provided. As shown in exemplary fashion in FIGS. 1-3, the hole 18 is formed through a top 13 of the post flange 14, through the flange 14, through the column 16 and through the base 30. Thus, the clip 10 may be screwed onto the instrument 60, for example, the base of a guitar. Further, the hole 18, may include a countersink 20 formed into the flange top 13 to accommodate a screw head or the head of a similar fastener.

The clip base 30 also comprises a free end 36. The free end 36 is formed to include a switchback 40. As shown, the switchback 40 may present a C-shaped profile. The switchback 40 includes a switchback base portion 42, a switchback reverse portion 44, and a switchback finger portion 46. The switchback base portion 42 is appended to a distal end 38 of the base 30, the switchback reverse portion 44 is appended to the switchback base portion 42, and the switchback finger portion 46 is appended to the switchback reverse portion 44. As shown in FIGS. 1-3, the entire clip 10 is of a one-piece construction and thus the base 30, the switchback base portion 42, the switchback reverse portion 44, and the switchback finger portion 46 form a continuous piece. The switchback base portion 42 has an inner surface 43, the switchback reverse portion 44 has an inner surface 45, and the switchback finger portion 46 has an inner surface 47. The switchback base portion inner surface 43 and the switchback finger portion inner surface 47 are positioned in a facing, spaced-apart relation.

Figure 4:
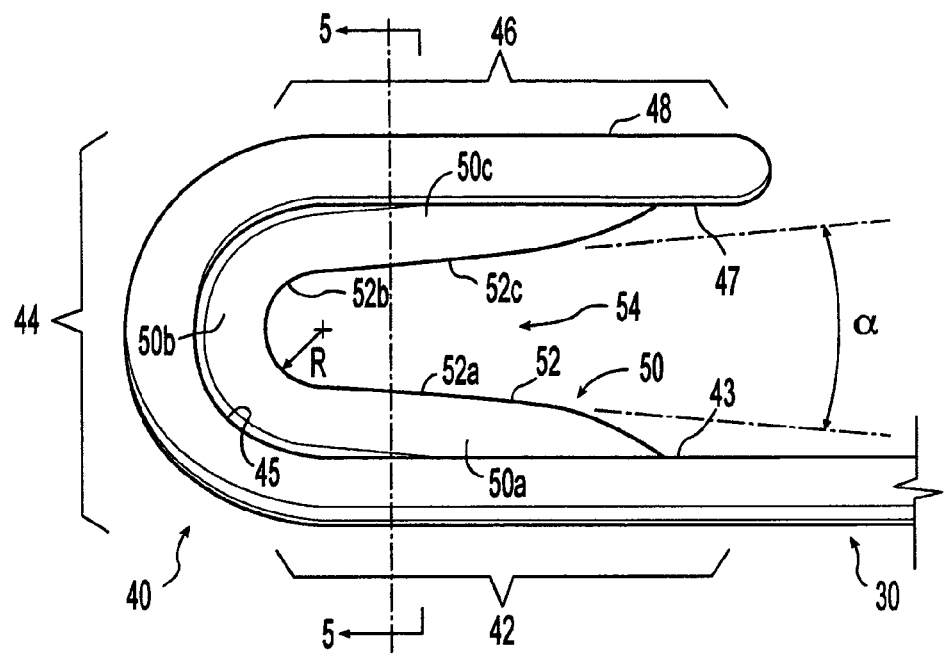
FIG. 4 is an enlarged side elevation view of a portion of the clip of FIG. 1.

Formed on the switchback base portion inner surface 43, the switchback reverse portion inner surface 45, and the switchback finger portion inner surface 47 is a rib 50. Atop the rib 50, and integral therewith, is a ridge 52. The rib 50, with its attendant ridge 52, then form a crotch 54. As shown in FIG. 4, the rib 50 comprises a base rib 50a with a base ridge 52a, a reverse rib 50b with a reverse ridge 52b, and a finger rib 50c with a finger ridge 52c.

Figure 5:
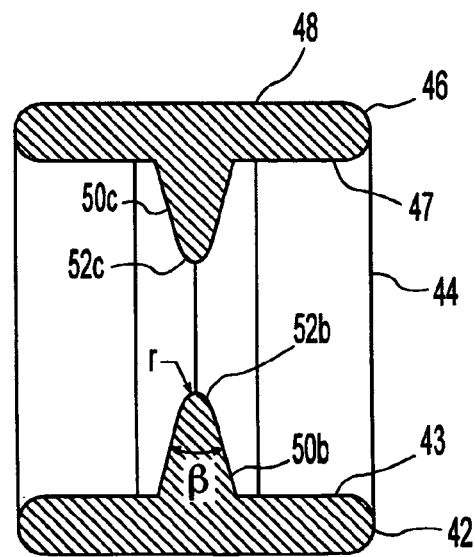
FIG. 5 is a cross-section view along the line 5-5 in FIG. 4.

As shown in FIG. 5, a cross-section of the rib 50 forms an angle $\beta$ of about 35 degrees. Also as shown in FIG. 5, a cross-section of the ridge 52 may have a radius of curvature of about 0.03 inches. During use, the ridge 52 grips or bites into the cable 62 to keep it from sliding through the clip 10. In this way, the cable 62 is kept from being accidentally pulled from the instrument 60 where the cable plug 64 is mated with the socket 66. As shown in FIG. 4, the reverse ridge 52b may have a radius R of about 0.08 inches. The radius R is chosen to be somewhat smaller than the group of cables 62 with which it will be used. If it is too large, the ridge 52 may not effectively grip the cable 62. As shown in FIG. 4, the base ridge 52a and the finger ridge 52c generally form an angle $\alpha$ of about 10 degrees. This feature allows the clip 10 to engage various sizes of cables 62 in common use by allowing the cable 62 to wedge into the crotch 54.

The choice of materials, for example, nylon 6,6, and the choice of dimensions, enable the switchback finger portion 46 to flex relative to the switchback base portion 42. This allows the clip 10 to handle a wider variety of cable diameters than it otherwise could.

As shown in FIG. 2, the post 12 may have a generally flat top surface 13 and the switchback finger portion 46 has a generally flat outer surface 48. When the dimension from the base bottom surface 34 and the post top surface 13 is about equal to the dimension from the base bottom surface 34 and the switchback finger portion outer surface 48, the clip 10 presents a stable platform upon which the instrument 60 may be rested.

As noted above, the clip 10 need not be of a one-piece construction. The clip 10 may comprise a separate base 30, which has a top surface 32, a bottom surface 34, a proximal end 35, and a distal end 38. The clip 10 may further comprise a separate switchback base portion 42, including a first end and a second end and an inner surface 43, a separate switchback reverse portion 44, including a first and a second end and an inner surface 45, and a separate switchback finger portion 46, including a first end and a second end and an inner surface 47. The switchback base portion first end is appended to the base distal end 38 and the switchback base portion inner surface 43 aligned with the base top surface 32. The switchback reverse portion first end is appended to the switchback base portion second end and the switchback reverse portion inner surface 45 aligned with the switchback base portion inner surface 43. The switchback finger portion first end is appended to the switchback reverse portion second end and the switchback finger portion inner surface 47 is aligned with the switchback reverse portion inner surface 45. Appended to the switchback base portion inner surface 43 is a switchback base rib 50a. Appended to the switchback reverse portion inner surface 45 is a switchback reverse rib 50b. Appended to the switchback finger portion inner surface 47 is a switchback finger rib 50c. As will be appreciated by those skilled in the art, the rib components 50a, 50b, and 50c may be formed as a continuous element. Further, the rib components 50a, 50b, and 50c may include a switchback base ridge 52a, a switchback reverse ridge 52b, and a switchback finger ridge 52c, respectively. As with the rib components 50a, 50b, and 50c, the ridge components 52a, 52b, and 52c may be formed as a continuous element. Further, as will be appreciated by those skilled in the art, the rib and ridge components may be formed as a continuous element.

Figure 7:
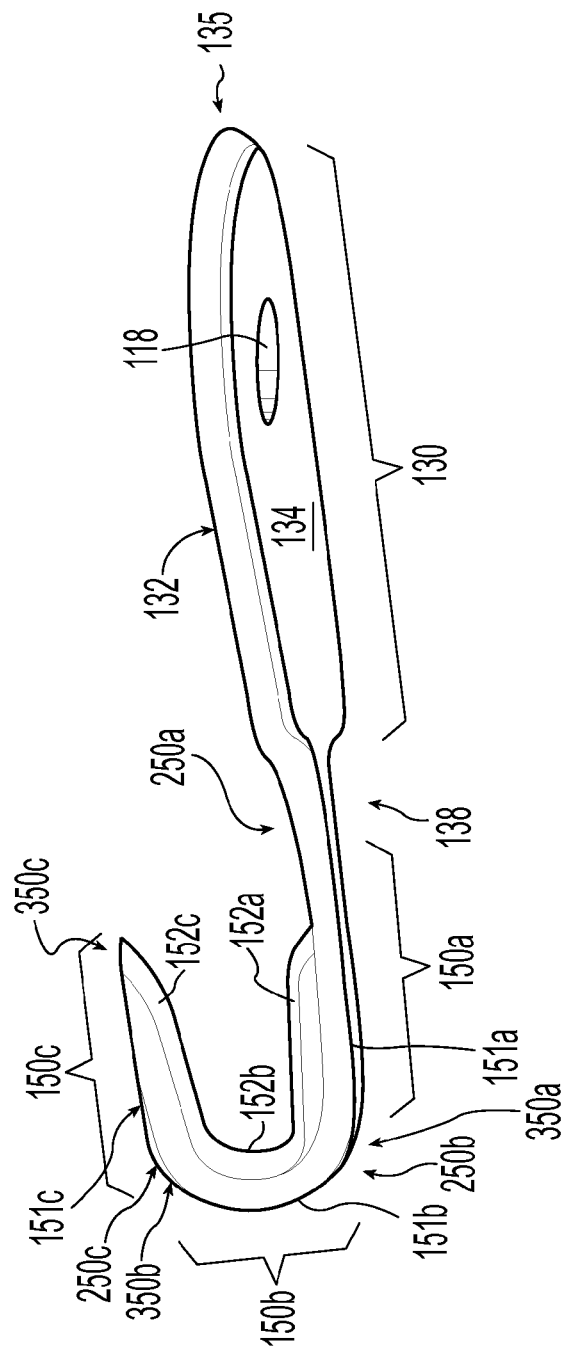
FIG. 7 is a perspective view of a further embodiment of a musical instrument clip according to the present invention.

A further embodiment is shown in FIG. 7. A clip 110 comprises a base 130 which has a top surface 132, a bottom surface 134, a proximal end 135, and a distal end 138. The clip 110 further comprises a rib base portion 150a which has a first end 250a, a second end 350a, a ridge 152a, and an outer surface 151a along the bottom of the rib base portion 150a. The rib base portion first end 250a is appended to the base distal end 138 and the rib base portion outer surface 151a is aligned with the base bottom surface 134. The clip 110 further comprises a rib reverse portion 150b which has a first end 250b, a second end 350b, a ridge 152b, and an outer surface 151b along the bottom of the rib reverse portion 150b. The rib reverse portion first end 250b is appended to the rib base portion second end 350a and the rib reverse portion outer surface 151b is aligned with the rib base portion outer surface 151a. The clip 110 further comprises a rib finger portion 150c which has a first end 250c, a second end 350c, a ridge 152c, and an outer surface 151c along the bottom of the rib finger portion 150c. The rib finger portion first end 250c is appended to the rib reverse portion second end 350b and the rib finger portion outer surface 151c is aligned with the rib reverse portion outer surface 151b.

In an exemplary embodiment, the clip 10 has a length of about 2½ inches and a width from side to side of about ½ inch. From the base bottom surface 34 to the switchback finger portion outer surface 48 is about ½ inch and, similarly from the base bottom surface 34 to the post top is about ½ inch. The gap between the post flange 14 and the end of the switchback finger portion is about 15/16 inch. The post flange 14 has a diameter of about 5/8 inch and a thickness of about 3/16 inch. The column 16 has a height of about ¼ inch.

In operation, the clip 10 is secured to the musical instrument 60 as shown in FIG. 6. In the case of a guitar, the strap 70 is buttoned to the post 12 via the buttonhole 72. The cable plug 64 is placed into the socket 66 and the cable 62 inserted into the clip 10 and into the clip crotch 54. The farther the cable 62 is inserted into the crotch 54, the greater the gripping force on the cable 62. Furthermore, smaller diameter cables 62 will easily be inserted further into the crotch 54 while larger diameter cables 62 will not go as far into the crotch 54. Both large and small diameter cables 62, however, may be gripped by the ridge 52 in the crotch 54. Flexion of the switchback 40 further enhances the ability of the clip 10 to accommodate cables of varying sizes under varying loads. A tug or pull on the cable 62 serves to bias the cable 62 further into the crotch 54, thereby holding the cable even more securely. When desired, the cable 62 may be easily disengaged from the crotch 54 and removed from the clip 10.

In the foregoing description certain terms have been used for brevity, clarity and understanding. However no unnecessary limitations are to be implied therefrom because such terms are for descriptive purposes and are intended to be broadly construed. Moreover the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated and the advantages and useful results attained; the new and useful structures, devices, elements, arrangements, parts, combinations, systems, equipment, operations, methods, processes, and relationships are set forth in the appended claims.

The invention claimed is:

1. A one-piece musical instrument cable clip, the clip comprising a strip-like base, the base having:
   a top surface;
   a bottom surface;
   a proximal end, the proximal end formed to include, on the top surface, a post, the post formed to include a flange atop a column interposed between the flange and the top surface the flange having a flat top surface; and
   a free end, the free end formed to include a switchback, the switchback formed to include:
   a switchback base portion adjacent the base, the switchback base portion having an inner surface and a width;
   a switchback reverse portion adjacent the switchback base portion, the switchback reverse portion having an inner surface;
   a switchback finger portion adjacent the switchback reverse portion, the switchback finger portion comprising an inner surface and a flat outer surface, the switchback finger portion inner surface in a facing, spaced apart relation with the switchback base portion inner surface; and
   a rib running generally along the switchback base portion inner surface, the switchback reverse portion inner surface, and the switchback finger portion inner surface, the rib having a ridge formed thereon, a portion of the ridge formed on the rib running generally along the switchback base portion inner surface and a portion of the ridge formed on the rib running generally along the switchback finger portion forming an acute angle, the switchback finger portion being flexibly responsive to a musical instrument cable being urged between the portion of the ridge formed on the rib running generally along the switchback base portion and the portion of the ridge formed on the rib running generally along the switchback finger portion, wherein the cable becomes frictionally removably secured in the clip, the rib further having a width where the rib meets the switchback base portion inner surface, the rib width smaller than the switchback base portion width, the portion of the ridge formed on the rib running along the switchback base portion forming a surface of decreasing slope from where the rib meets the switchback base portion and the rib formed on the ridge running along the switchback reverse portion, the flange top surface and the switchback finger portion outer surface cooperating to form portions of a flat surface, the flat surface parallel with the base bottom surface.

2. The clip of claim 1, wherein the switchback reverse portion has a C-shaped profile.

3. The clip of claim 1, wherein the clip has a J-shaped profile.

4. The clip of claim 1, further comprising a hole traversing from a top surface of the post to the clip bottom surface.

5. The clip of claim 1, wherein a cross-section of the rib forms an angle of about 35 degrees.

6. The clip of claim 1, wherein a cross-section of the ridge has a radius of curvature of about 0.03 inches.

7. The clip of claim 1, wherein the acute angle is about 10 degrees.

8. The clip of claim 1, wherein a portion of the rib formed on the switchback reverse portion inner surface has a radius of curvature of about 0.08 inches.

9. The clip of claim 1, wherein the clip is formed of nylon 6,6.

10. A musical instrument cable clip, comprising:
a base having:
a top surface;
a bottom surface;
a proximal end; and
a distal end;
a switchback base portion including a first end and a second end and an inner surface, the first end appended to the base distal end and the switchback base portion inner surface aligned with the base top surface;
a switchback reverse portion including a first end and a second end and an inner surface, the first end appended to the switchback base portion second end and the switchback reverse portion inner surface aligned with the switchback base portion inner surface;
a switchback finger portion including a first end and a second end and an inner surface, the first end appended to the switchback reverse portion second end and the switchback finger portion inner surface aligned with the switchback reverse portion inner surface; and
a switchback base rib appended to the switchback base portion inner surface;
a switchback reverse rib appended to the switchback reverse portion inner surface; and
a switchback finger rib appended to the switchback finger portion inner surface, wherein the switchback base rib and the switchback finger rib form an acute angle, the switchback finger portion being flexibly responsive to a musical instrument cable being urged between the switchback base rib and the switchback finger rib, wherein the cable becomes frictionally removably secured to the clip.

11. The clip of claim 10, wherein the switchback base rib, the switchback reverse rib, and the switchback finger rib form a continuous rib.

12. The clip of claim 10, wherein:
the switchback base rib is formed to include a switchback base ridge;
the switchback reverse rib is formed to include a switchback reverse ridge; and
the switchback finger rib is formed to include a switchback finger ridge.

13. The clip of claim 12, wherein the switchback base ridge, the switchback reverse ridge, and the switchback finger rib form a continuous ridge.

14. The clip of claim 12, wherein the switchback base ridge and the switchback finger ridge form an angle of about 10 degrees.

15. The clip of claim 12, wherein the switchback reverse ridge has a radius of curvature of about 0.08 inches.

16. The clip of claim 10, further comprising a post appended to the distal end on the top surface.

17. The clip of claim 16, wherein the post comprises:
a flange; and
a column, the column appended between the flange and the top surface.

18. A musical instrument cable clip, comprising:
a base having:
a top surface;
a bottom surface;
a proximal end; and
a distal end;
a rib base portion, including:
a first end;
a second end;
a ridge along a top of the rib; and
an outer surface along a bottom of the rib base portion, wherein the rib base portion first end is appended to the base distal end and the rib base portion outer surface is aligned with the base bottom surface;
a rib reverse portion, the rib reverse portion being generally C-shaped, and including:
a first end;
a second end;
a ridge along a top of the rib; and
an outer surface along a bottom of the rib reverse portion, wherein the rib reverse portion first end is appended to the rib base portion second end and the rib reverse outer surface is aligned with the rib base portion outer surface; and
a rib finger portion, including:
a first end;
a second end;
a ridge along the top of the rib, wherein the rib base portion ridge and the rib finger portion ridge form an acute angle, and wherein the rib finger portion is flexibly responsive to frictionally removably secure a musical instrument cable being urged between the rib base portion and the rib finger portion; and
an outer surface along a bottom of the rib finger portion, wherein the rib finger portion first end is appended to the rib reverse portion second end and the rib finger outer surface is aligned with the rib reverse portion outer surface, the rib base portion ridge in a facing, spaced apart relation with the rib base portion ridge.

19. The clip of claim 18, wherein the acute angle is about 10 degrees.

20. The clip of claim 10, wherein:

the proximal end is formed to include, on the top surface, a post, the post formed to include a flange atop a column interposed between the flange and the top surface of the base proximal end top surface, the flange having a top surface;

the switchback finger portion further comprising an outer surface; and the flange top surface and the switchback finger portion outer surface cooperating to form portions of a flat surface.

* * * * *